(12) United States Patent
Reverdin

(10) Patent No.: US 7,482,525 B2
(45) Date of Patent: Jan. 27, 2009

(54) MUSIC NOTATION

(76) Inventor: Nathalie Reverdin, Rue du Pont-Neuf 2, CH-1227 Geneva (CH)

( * ) Notice: Subject to any disclaimer, the term of this patent is extended or adjusted under 35 U.S.C. 154(b) by 247 days.

(21) Appl. No.: 11/450,660

(22) Filed: Jun. 8, 2006

(65) Prior Publication Data

US 2007/0295194 A1 Dec. 27, 2007

(51) Int. Cl.
*G09B 15/00* (2006.01)
(52) U.S. Cl. .................................. 84/485 R
(58) Field of Classification Search ............... 84/483.1, 84/483.2, 484, 485 R, 479 A, 482
See application file for complete search history.

(56) References Cited

U.S. PATENT DOCUMENTS 5,549,029 A * 8/1996 Lepinski .................. 84/483.2
6,841,724 B2 * 1/2005 George .................... 84/477 R

OTHER PUBLICATIONS

"Baroque tablature," http://www.myriad-online.com/resources/docs/manual/english/tabfret.htm, Retrieved from the Internet on Apr. 4, 2006.
"Part I: So You Wanna Play Guitar—How to read tablature," pre-Jun. 8, 2006.
"Part II: So Start Playing: The Basics—Reading Tablature while Listening to the CD," pre-Jun. 8, 2006.
"How to Read Chord Frames," pre-Jun. 8, 2006.
How the Strings are Numbered; How to Read a Fingerboard Diagram, pre-Jun. 8, 2006.
"Guitar For Dummies® Cheat Sheet," pre-Jun. 8, 2006.
"Music Notation," pre-Jun. 8, 2006.

* cited by examiner

*Primary Examiner*—Kimberly R Lockett
(74) *Attorney, Agent, or Firm*—Fish & Richardson P.C.

(57) ABSTRACT

This invention relates to a method and apparatus for notating music for a stringed instrument. A weighted tablature includes a staff having multiple horizontal lines. Each line represents a string of a musical instrument and at least some of the lines are of varying thicknesses. The relative thickness of a line corresponds to the relative thickness of the string represented by the line. In another aspect, a weighted chord diagram includes multiple vertical lines and multiple horizontal lines intersecting to form a grid. Each vertical line represents a string of a musical instrument and at least some of the lines are of varying thicknesses, the relative thickness of a line corresponding to a relative thickness of the string represented by the line. At least some of the horizontal lines represent a fret. A marking placed on the tablature or grid indicates a string to be played at a specified fret.

53 Claims, 5 Drawing Sheets

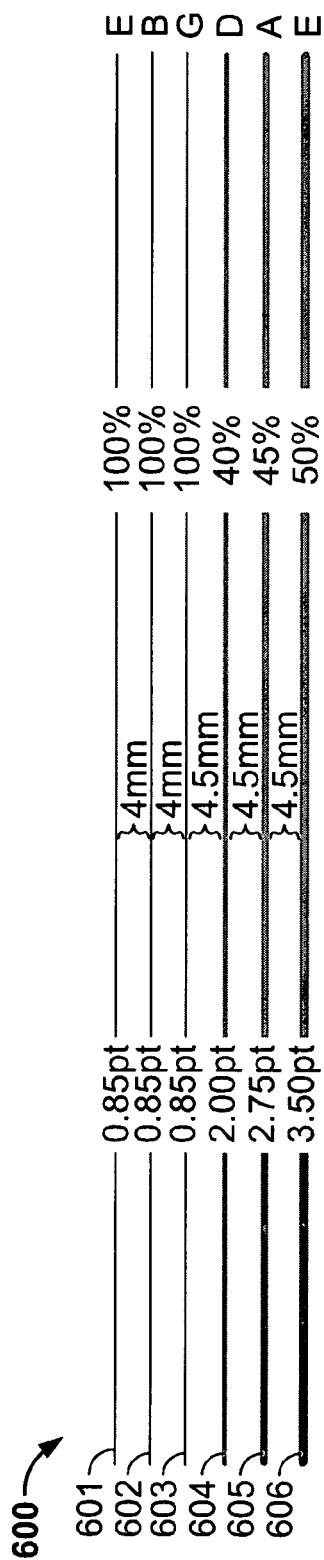
FIG. 7A
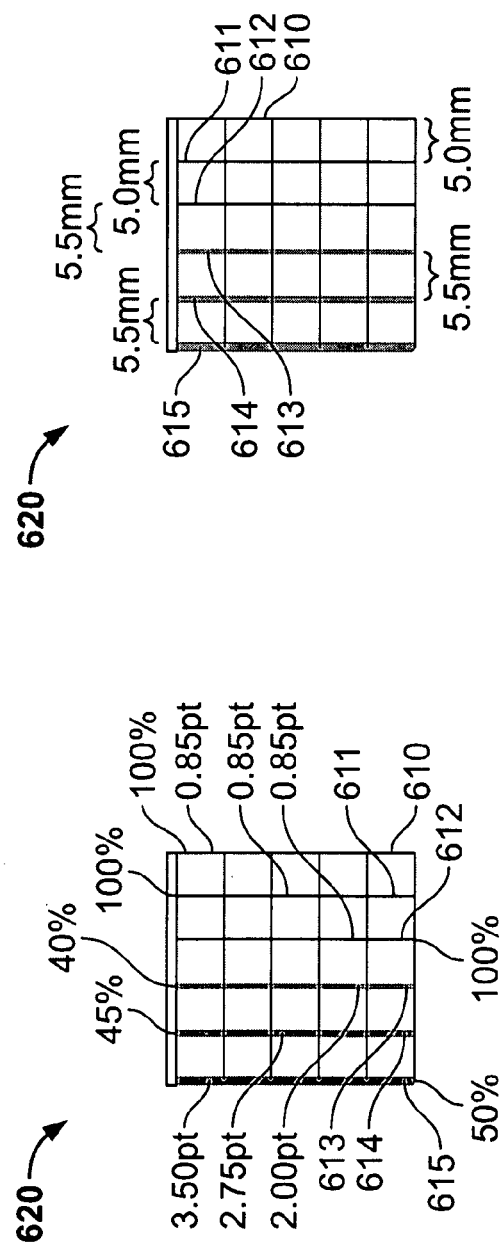
FIG. 7B
FIG. 7C

MUSIC NOTATION

TECHNICAL FIELD

This invention relates to a method and apparatus for notating music for stringed instruments.

BACKGROUND

Tablature is a type of music notation that is specific to stringed instruments, for example, guitar, bass, lute and vihuela, to name a few. Use of tablature dates back to the 1300's. Tablature graphically represents the frets and strings of the instrument, and indicates to a musician what string to fret and where on the fingerboard to fret the string. It is a graphical representation of where the musical notes are to be physically played by the musician on the instrument.

By way of example, in a conventional six string guitar, the strings are numbered one through six, starting with the highest sounding string, i.e., high E. Some of the strings are of varying thicknesses, with the sixth string being the thickest, and therefore the lowest sounding, string. When holding a guitar in a typical playing position, the string positioned closest to the floor is the first string and the string positioned closest to the ceiling is the sixth string. A conventional guitar tablature staff is a graphical depiction of six identical and equally spaced horizontal lines, the uppermost line corresponding to the first string and the lowermost line corresponding to the sixth string.

A conventional chord diagram depicts a grid formed from six vertical lines and six horizontal lines. For use with a guitar, the vertical lines each represent a guitar string and the horizontal lines represent the nut and five frets. A filled circular marking placed on one of the vertical lines and within a space formed between two horizontal lines indicates to the guitar player which string to play and at which fret. The six vertical lines are identical in thickness and spaced equally from one another; the six horizontal lines are also identical in thickness and spaced equally from one another, although sometimes the uppermost horizontal line representing the nut is drawn thicker.

A conventional, prior art guitar tablature staff 100 is shown in FIG. 1. The tablature staff 100 is configured for use with a six string guitar, and includes six horizontal lines of identical weight and spaced evenly apart. The uppermost line 102 represents the first string on guitar, the lowermost line 112 represents the sixth string on the guitar and lines 104-110 represent the second to fifth strings respectively. A numeric marking 114 positioned on the line 104 representing the second string indicates that the musician is to play the second string at the first fret; the value of the numeric marking, i.e., "1", indicates the fret. In the second bar (where bars are separated by one or more lines), a second numeric marking 116 indicates the musician is to play the fourth string at the third fret. The third bar includes numeric markings indicating a chord to be played on the guitar. In this example, the chord is an E chord. A numeric marking of zero, e.g., markings 118, 120 and 122, means the open string is to be played. In Baroque tablature, alphabetic markings are used in place of numeric markings. For example, the first fret is marked with a "b" rather than the number "1".

A conventional, prior art chord diagram 150 is shown in FIG. 2. In this example, the chord diagram 150 is configured for use with a six string guitar, and includes six horizontal lines and six vertical lines forming a grid. The six vertical lines 152-162 each represent a guitar string and are of identical weight and evenly spaced. The uppermost horizontal line 164 represents the nut and is thicker than the other five horizontal lines 166-174, which each represent a fret. The leftmost vertical line 162 represents the sixth string, the rightmost vertical line 152 represents the first string, and the lines 154-160 between represent the second through fifth strings in sequential order. Markings on or above the grid indicate to a musician which string to play and at which fret. For example, the markings shown represent the E chord, which is also depicted in the third bar in FIG. 1. The open string of the first, second and sixth strings 152, 154 and 162 are to be played; the first fret of the third string 156 and the second fret of the fourth and fifth strings 158, 160.

Tablature is usually used in conjunction with a music staff, i.e., a treble staff, that is formed from five horizontal lines. Notes are indicated on a music staff and indicate the musical notes to be played and their rhythm (e.g., G, A, etc), as compared to the markings on a tablature staff that indicate the string to be played, i.e., where on the instrument to play the note (e.g., first string, second string, etc.).

SUMMARY

This invention relates to a method and apparatus for notating music for certain stringed instruments. In general, in one aspect, the invention features a weighted tablature including a staff having a plurality of horizontal lines. Each line represents a string of a musical instrument and at least some of the lines are of varying thicknesses. The relative thickness of a line corresponds to the relative thickness of the string represented by the line.

Implementations of the invention can include one or more of the following features. The lowermost line can be the thickest line and the thicknesses of the lines can decrease in a direction from the lowermost to an uppermost line. The musical instrument can be a six-string guitar and the staff can include six horizontal lines where the lowermost line corresponds to a sixth string on the guitar, the uppermost line corresponds to a first string on the guitar and the lines between the uppermost and lowermost lines correspond to the second through fifth strings on the guitar in a sequential order. In another implementation, the uppermost line can be the thickest line and the thicknesses of the lines can decrease in a direction from the uppermost to a lowermost line.

In one implementation, the musical instrument is a six-string guitar and there are six horizontal lines. A first line corresponds to a first string on the guitar, a second line corresponds to a second string on the guitar, a third line corresponds to a third string on the guitar, a fourth line corresponds to a fourth string on the guitar, a fifth line corresponds to a fifth string on the guitar and a sixth line corresponds to a sixth string on the guitar. The first, second and third lines are of approximately the same thickness, the fourth line is thicker than the first, second and third lines, the fifth line is thicker than the fourth line and the sixth line is thicker than the fifth line. The spacing between the first line and the second line can be approximately equal to the spacing between the second line and the third line. The spacing between the third line and the fourth line can be approximately equal to the spacing between the fourth line and the fifth line and also approximately equal to the spacing between the fifth line and the sixth line, where said spacing is greater than the spacing between the first and the second lines. The first line can correspond to the note high E, the second line can correspond to the note B, the third line can correspond to the note G, the fourth line can correspond to the note D, the fifth line can correspond to the note A, and the sixth line can correspond to the note low E. The first line can be an uppermost line and the sixth line can be a lowermost line and the second, third, fourth and fifth lines can be positioned between the first and the sixth line in sequential order.

The musical instrument can be, for example, a guitar, a bass, a lute or a vihuela. The weighted tablature can further include one or more markings, where each marking is positioned on one of the horizontal lines and the position of a marking and a value of the marking indicate a string to be played and a fret at which to play the string respectively. The tablature can be printed on a physical media, e.g., paper and formed sheet music, or can be displayed on an electronic device, e.g., a computer coupled to a computer monitor. Each marking can be a numeric marking, or in the case of Baroque style tablature, each marking can be an alphabetical marking.

In general, in another aspect, the invention features a weighted chord diagram including a plurality of vertical lines and a plurality of horizontal lines. Each vertical line represents a string of a musical instrument and at least some of the lines are of varying thicknesses, the relative thickness of a line corresponding to a relative thickness of the string represented by the line. At least some of the horizontal lines represent a fret. The vertical lines are intersected by the horizontal lines forming a grid, and a marking placed on a vertical line and within a space between two horizontal lines indicates a string to be played at a specified fret.

Implementations of the invention can include one or more of the following features. A marking placed above a vertical line can indicate an open string to be played. The leftmost vertical line can be the thickest line and the thicknesses of the vertical lines can decrease in a direction from the leftmost to the rightmost line.

In one implementation, the musical instrument is a six-string guitar and there are six vertical lines. The leftmost vertical line corresponds to a sixth string on the guitar, the rightmost vertical line corresponds to a first string on the guitar, and the lines between the leftmost and rightmost lines correspond to the fifth through second strings on the guitar in a sequential order. In this implementation, the leftmost vertical line is the thickest line and the thicknesses of the vertical lines decrease in a direction from the leftmost to the rightmost vertical line. In another implementation, the leftmost vertical line corresponds to the first string and the rightmost vertical line corresponds to the sixth string, and the rightmost vertical line is the thickest line and the thicknesses of the vertical lines decrease in a direction from the rightmost to the leftmost vertical line.

In another implementation, the musical instrument is a six-string guitar and there are six vertical lines where the rightmost vertical line corresponds to a sixth string on the guitar, the leftmost vertical line corresponds to a first string on the guitar, and the lines between the leftmost and rightmost lines correspond to the second through fifth strings on the guitar in a sequential order.

In one implementation, the musical instrument is a six-string guitar and there are six vertical lines. A first vertical line corresponds to a first string on the guitar, a second vertical line corresponds to a second string on the guitar, a third vertical line corresponds to a third string on the guitar, a fourth vertical line corresponds to a fourth string on the guitar; a fifth vertical line corresponds to a fifth string on the guitar, a sixth vertical line corresponds to a sixth string on the guitar. The first, second and third vertical lines are of approximately the same thickness, the fourth vertical line is thicker than the first, second and third vertical lines, the fifth vertical line is thicker than the fourth vertical line and the sixth vertical line is thicker than the fifth vertical line. A first spacing between the first vertical line and the second vertical line can be approximately equal to a first spacing between the second vertical line and the third vertical line and can be also approximately equal to a first spacing between the third vertical line and the second vertical line. A second spacing between the third vertical line and the fourth vertical line can be approximately equal to a second spacing between the fourth vertical line and the fifth vertical line and also approximately equal to a second spacing between the fifth vertical line and the sixth vertical line. The first spacing is less than the second spacing. The first line can correspond to the note high E, the second line can correspond to the note B, the third line can correspond to the note G, the fourth line can correspond to the note D, the fifth line can correspond to the note A, and the sixth line can correspond to the note low E. The first vertical line can be the rightmost line and the sixth vertical line can be the leftmost line and the second, third, fourth and fifth lines can be spaced between the first and the sixth lines in sequential order.

The musical instrument can be, for example, a guitar, a bass, a lute and a vihuela. The chord diagram can be printed on a physical media, e.g., paper, or can be displayed on an electronic device.

In general, in another aspect, the invention features a method for notating strings to be played on a musical instrument. A weighted tablature staff is provided including a plurality of horizontal lines, where each line represents a string on the musical instrument and at least some of the lines are of varying thicknesses. The relative thickness of a line corresponds to the relative thickness of the string represented by the line. One or more markings are indicated on the weighted tablature staff, where each marking is positioned on one of the horizontal lines. The position of a marking and a value of the marking indicate a string to played and a fret at which to play the string respectively.

Implementations of the invention can include one or more of the following features. The musical instrument can be a guitar. Each marking can be a numeric marking or, in the case of a Baroque style tablature, each marking can be an alphabetical marking. The weighted tablature staff can be provided printed on a physical media. For example, the physical media can be paper and the weighted tablature staff and one or more markings indicated thereon can form sheet music. Alternatively, the weighted tablature staff can be provided displayed on an electronic device, e.g., a computer coupled to a computer monitor.

In general, in another aspect, the invention features a method for notating strings to be played on a musical instrument, where the method includes the step of providing a weighted chord diagram. The weighted chord diagram includes a plurality of vertical lines, where each line represents a string on the musical instrument and at least some of the lines are of varying thicknesses, the relative thickness of a line corresponding to the relative thickness of the string represented by the line. The weighted chord diagram further includes a plurality of horizontal lines, where at least some of the lines represent a fret. The vertical lines are intersected by the horizontal lines forming a grid. One or more markings are indicated on the weighted chord diagram, where each marking is positioned on one of the vertical lines and within a space between two horizontal lines. The position of a marking indicates a string to played based on the vertical line upon which the marking is positioned and a fret at which to play the string based on the space within which the marking is positioned.

Implementations of the invention can include one or more of the following features. The musical instrument can be a guitar. The weighted chord diagram can be provided printed on a physical media, e.g., paper, or can be provided displayed on an electronic device, e.g., a computer coupled to a computer monitor.

Implementations of the invention can realize one or more of the following advantages. By providing a weighted tablature staff with weighted lines, i. e., lines of varying thickness corresponding to the thickness of the strings represented by each line, a musician is given a visual prompt as to which string on an instrument to fret. This configuration of tablature staff can be particularly useful to beginner musicians, particularly as the orientation of the lines in the tablature staff may seem counter-intuitive to the arrangement of their corresponding strings on the instrument. For example, because the first string is at the top of a conventional tablature but at the bottom of the string set when a guitar is held in a playing position. Providing a chord diagram with weighted vertical lines again gives the musician a visual prompt as to which string to fret.

Using different shades of color to distinguish between the weighted lines can also facilitate the distinction for the musician. For example, if the lines are black, then using lines with different percentages of black (i.e., some lighter and some darker), the distinction between the "heavier" and "lighter" lines can be more pronounced. Other colors of lines can be used, as well as multi-colored lines of varying weight. A beginner musician learning to play a conventional six string guitar including three nylon strings and three metal strings may also find the varied line weighting on the tablature and chord diagram helpful in locating strings in either the nylon or metal string group.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 7A-C show annotated versions of one implementation of a weighted tablature and weighted chord diagram.

Like reference symbols in the various drawings indicate like elements.

DETAILED DESCRIPTION

The methods, tablature and chord diagrams described herein can be used for certain stringed instruments. Examples of stringed instruments that can make use of tablature for music notation include, but are not limited to, guitar, bass, lute, vihuela, ukulele, mandolin, banjo and viola da gamba. For illustrative purposes, the methods, tablature and chord diagrams are described below in the context of a guitar. However, it should be understood that the description is in no way intended to be limited to guitars, and the use of the methods and techniques described herein in the context of a guitar is merely exemplary. Additionally, it should be noted that the tablature and chord diagrams described herein can be implemented by printing them on a physical media, e.g., paper, or by displaying them on an electronic device, e.g., a computer screen, or otherwise.

Figure 1:
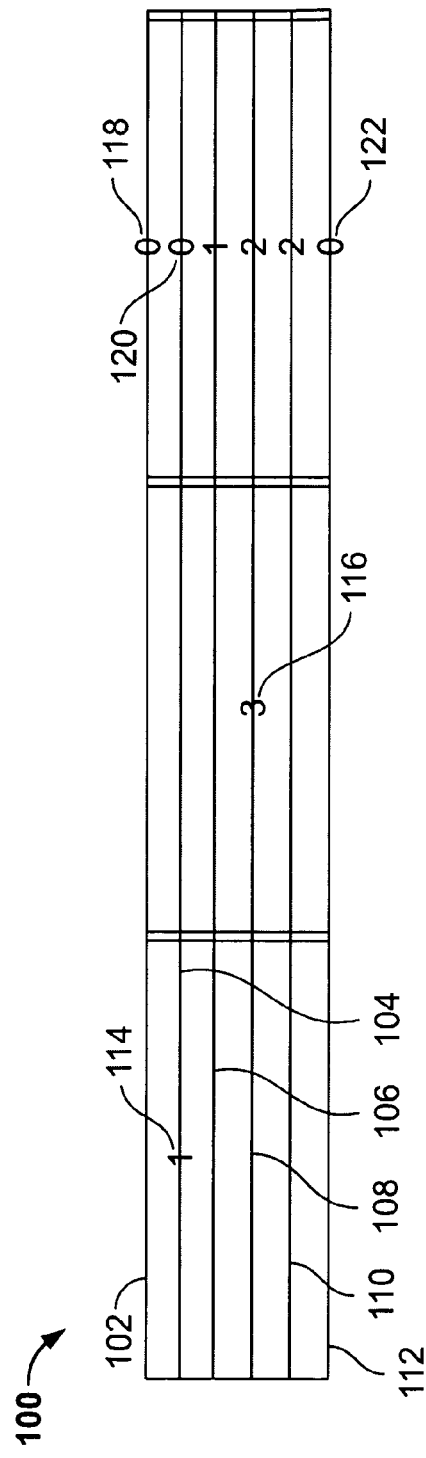
FIG. 1 shows a prior art tablature staff.
Figure 2:
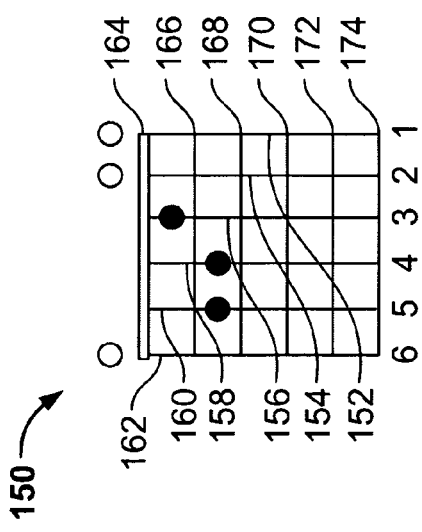
FIG. 2 shows a prior art chord diagram.
Figure 3A:
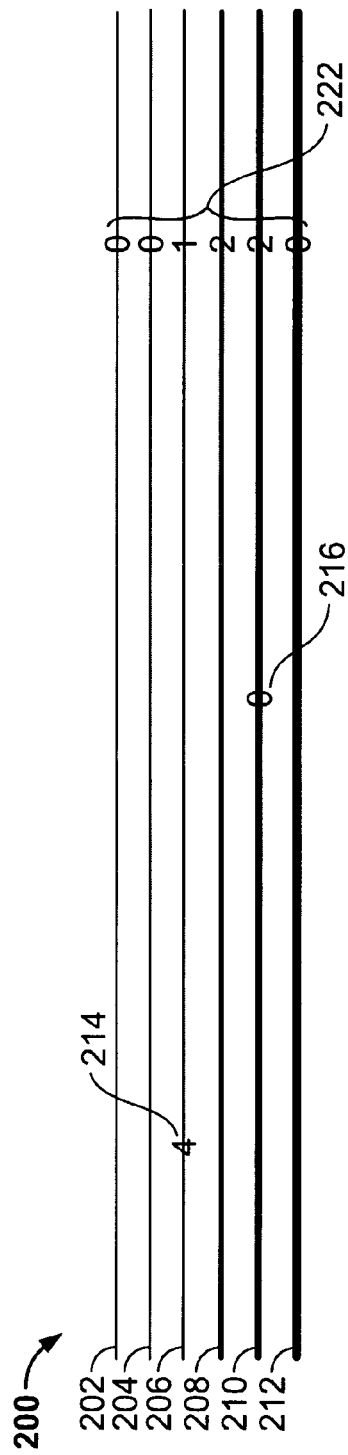
FIG. 3A shows a six string weighted tablature staff.

Referring to FIG. 3A, a weighted tablature 200 is provided. As mentioned above, in this example the weighted tablature 200 is configured for used with a guitar, more particularly, a six string guitar. The weighted tablature 200 includes a staff having a multiple horizontal lines, where each line represents a guitar string. At least some of the lines are of varying weights (i.e., different thicknesses relative to one another) and a relative thickness of a line corresponds to a relative thickness of the guitar string represented by the line.

In this implementation, the uppermost line 202 represents the first string of a guitar, the lowermost line 212 represents the sixth string of the guitar and the four lines 204-210 in between represent the second through fifth strings in sequential order. Some of the lines are weighted more heavily than others. The difference in weight, that is the relative thickness of the lines, corresponds to the relative thicknesses of the guitar strings represented by the lines. For example, the lowermost line 212 is the thickest and represents the sixth string of a guitar, which is the thickest guitar string. The first, second and third lines 202-206 are of substantially the same thickness, as the first, second and third strings on a guitar (which are the strings represented by these lines) are of substantially the same thickness. The fourth line 208 is slightly thicker than the first-third lines 202-206, and the fifth line 210 is slightly thicker than the fourth line 208, but thinner than the sixth line 212. Again, the thickness of the lines corresponds to the thickness of the represented guitar strings, as the fourth string is thicker than the first-third strings and the fifth string is thicker than the fourth string, yet thinner than the sixth string. In a conventional six string guitar, the first-third strings are made from nylon and the fourth-sixth strings are made from metal. The visual distinction between the first-third set of strings and the fourth-six set of strings in the weighted tablature can make it easier for a beginner musician to locate a string in the nylon set of strings or the metal set of strings.

In another embodiment, the uppermost line can represent the sixth string and the lowermost line can represent the first string, and the lines in between can represent the second through fifth strings in sequential order. In this embodiment, the uppermost line is weighted the most heavily and the thickness of the lines decreases in a direction from the uppermost to the lowermost line.

In the implementation shown, numeric markings on the weighted tablature 200 indicate to a musician which string to play and at what fret. The position of the numeric marking indicates the string to be played and the numerical value of the marking indicates the fret. For example, numeric marking 214 indicates that the third string is to be played at the fourth fret. A zero value of a marking indicates the open string is to be played, for example, marking 216 indicates that the open string of the fifth string is to be played. In another implementation, alphabetical markings on the weighted tablature 200 can be used to indicate which string to play and at what fret, for example, if Baroque style tablature is used.

In one implementation, the spacing between the horizontal lines is substantially identical. In another implementation, the spacing between the horizontal lines varies. In the embodiment shown in FIG. 3A, the spacing between some of the horizontal lines is different than between others. In this embodiment, the spacing 218 between the first, second and third lines 202-206 is substantially identical and the spacing 220 between the third, fourth, fifth and sixth lines 208-212 is substantially identical and greater than the spacing 218. Spacing is measured from the center of a line and spacing in this manner can improve readability and compensate for the differences in line thickness. Other configurations of line spacing are possible, and the embodiment shown is just one example. In one implementation, the first spacing is approximately four millimeters and the second spacing is approximately four and a half (4.5) millimeters.

Figure 3B:
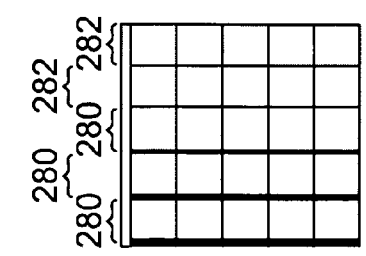
FIG. 3B shows a six string weighted chord diagram.
Figure 3B:
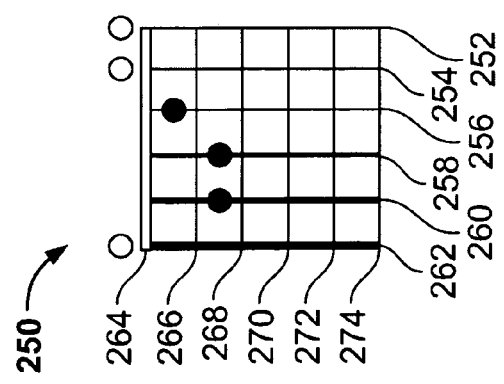

Referring to FIG. 3B, a weighted chord diagram 250 is shown. In this embodiment, the chord diagram 250 is configured for use with a six string guitar, and includes six horizontal lines and six vertical lines forming a grid. The six vertical lines 252-262 each represent a guitar string. The uppermost horizontal line 264 represents the nut and is thicker than the other five horizontal lines 266-274, which each represent a fret.

In the embodiment shown, the leftmost vertical line 262 represents the sixth string, the rightmost vertical line 252 represents the first string, and the lines 254-260 between represent the second through fifth strings in sequential order. The vertical lines are weighted according to the relative thicknesses of the guitar strings they represent. For example, the leftmost vertical line 262 representing the sixth string of a guitar is weighted the most heavily (i.e., is the thickest) as the sixth string of a guitar is the thickest string.

Markings on or above the grid indicate to a musician which string to play and at which fret. For example, the markings shown represent the E chord, which is also depicted above in FIG. 3A as markings 222. The open string of the first, second and sixth strings 252, 254 and 262 are to be played; the first fret of the third string 256 and the second fret of the fourth and fifth strings 258, 260.

In one implementation, the spacing between the vertical lines is substantially identical. In another implementation, the spacing between the vertical lines varies. In the embodiment shown in FIG. 3B, the spacing between some of the vertical lines is different than between others. In this embodiment, the spacing 280 between the lines 262-260, lines 260-258 and lines 258-256 is substantially identical and the spacing 282 between lines 256-254 and lines 254-252 is substantially identical and less than the spacing 280. Other configurations of line spacing are possible, and the embodiment shown is just one example. Spacing is measured from the center of a line and spacing in this manner can improve readability and compensate for the differences in line thickness. In one implementation, the first spacing 280 is approximately five and a half (5.5) millimeters and the second spacing 282 is approximately five (5) millimeters.

In the implementation shown, the weighted chord diagram 250 includes six horizontal lines 266-274 representing the nut and five frets. However, in other implementations, more or fewer horizontal lines can be included, depending on the number of frets desired to be represented.

Figure 4:
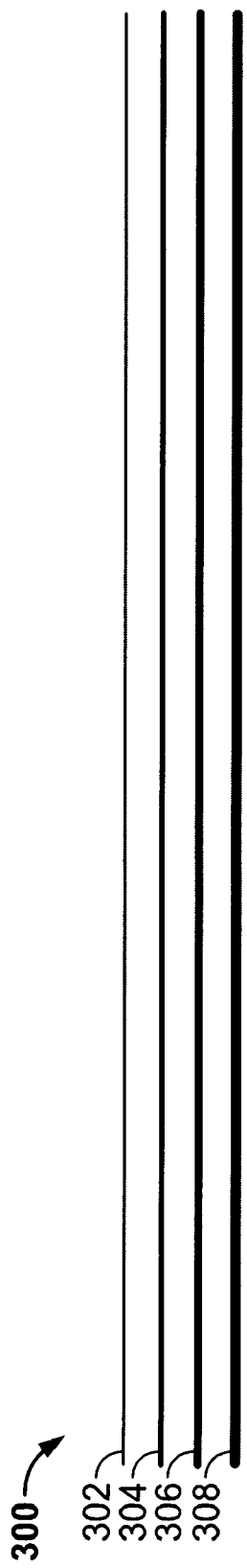
FIG. 4 shows a four string weighted tablature staff.

In other implementations, the weighted tablature and weighted chord diagrams can be configured for use with guitars that have more or fewer strings, for example, bass guitars having four or five strings, or a seven string guitar. Referring to FIG. 4, an example of a weighted tablature 300 configured for use with a 4 string guitar is shown. The tablature 300 includes four horizontal lines, each line representing a guitar string. In the embodiment shown, the uppermost line 302 represents the first string, the lowermost line 308 represents the fourth string, and the lines 304, 306 in between represent the second and third strings in sequential order. The lines are weighted in thickness according to the relative thickness of the guitar strings they represent.

In another embodiment, the order of the strings can be reversed, and the uppermost line can be the thickest representing the fourth string, and the lowermost line the thinnest representing the first string. As described above in reference to the implementation shown in FIG. 3A, the spacings between the horizontal lines 302-308 can be identical or can be varied. A weighted chord diagram for a four string guitar can also be provided, and would be configured similarly to the weighted chord diagram 250 for a six string guitar shown in FIG. 3B but with four vertical lines instead of six.

Figure 5:
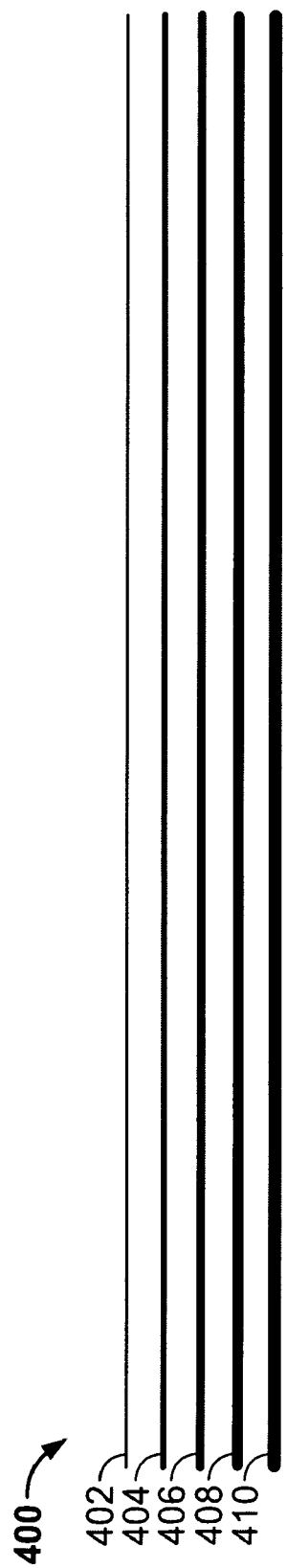
FIG. 5 shows a five string weighted tablature staff.

Referring to FIG. 5 an example of a weighted tablature 400 configured for use with a five string guitar is shown. The tablature 400 includes five horizontal lines 402-410, each line representing a guitar string. In the embodiment shown, the uppermost line 402 represents the first string, the lowermost line 410 represents the fifth string, and the lines 404-408 in between represent the second, third and fourth strings in sequential order. The lines are weighted in thickness according to the relative thickness of the guitar strings they represent.

In another embodiment, the order of the strings can be reversed, and the uppermost line can be the thickest representing the fifth string, and the lowermost line the thinnest representing the first string. As described above in reference to the implementation shown in FIG. 3A, the spacings between the horizontal lines 402-410 can be identical or can be varied. A weighted chord diagram for a five string guitar can also be provided, and would be configured similarly to the weighted chord diagram 250 for a six string guitar shown in FIG. 3B but with five vertical lines instead of six.

Figure 6A:
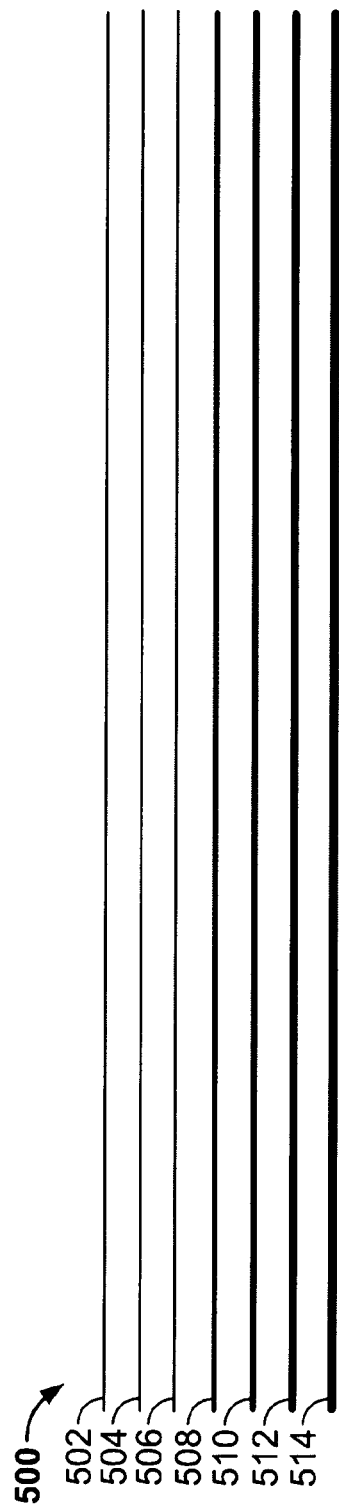
FIG. 6A shows a seven string weighted tablature staff.

Referring to FIG. 6A, an example of a weighted tablature 500 configured for use with a seven string guitar is shown. The tablature 500 includes seven horizontal lines 502-514, each line representing a guitar string. In the embodiment shown, the uppermost line 502 represents the first string, the lowermost line 514 represents the seventh string, and the lines 504-512 in between represent the second through sixth strings in sequential order. The lines are weighted in thickness according to the relative thickness of the guitar strings they represent. In another embodiment, the order of the strings can be reversed, and the uppermost line can be the thickest representing the seventh string, and the lowermost line the thinnest representing the first string. As described above in reference to the implementation shown in FIG. 3A, the spacings between the horizontal lines 502-514 can be identical or can be varied.

Figure 6B:
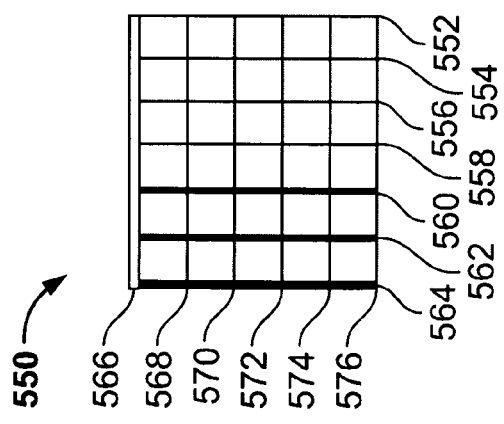
FIG. 6B shows a seven string weighted chord diagram.

Referring to FIG. 6B, a weighted chord diagram 550 is shown. In this embodiment, the chord diagram 550 is configured for use with a seven string guitar, and includes six horizontal lines 566-576 and seven vertical lines 552-564 forming a grid. The seven vertical lines 552-564 each represent a guitar string. The uppermost horizontal line 566 represents the nut and is thicker than the other five horizontal lines 568-576, which each represent a fret.

In the embodiment shown, the leftmost vertical line 564 represents the seventh string, the rightmost vertical line 552 represents the first string, and the vertical lines 554-562 between represent the second through sixth strings in sequential order. The vertical lines are weighted according to the relative thicknesses of the guitar strings they represent. For example, the leftmost vertical line 564 representing the seventh string of a guitar is weighted the most heavily (i.e., is the thickest) as the seventh string of a guitar is the thickest string.

In the implementation shown, the weighted chord diagram 550 includes six horizontal lines 566-576 representing a nut and five frets. However, in other implementations, more of fewer horizontal lines can be included, depending on the number of frets desired to be represented. As described above in reference to the implementation shown in FIG. 3B, the spacings between the vertical lines 552-564 can be identical or can be varied.

Referring to FIGS. 7A-C, particular implementations of a weighted tablature 600 and weighted chord diagram 620 are shown for a six string guitar. The line weights, line spacing and percentage of color (in this implementation, the percentage of black) used to form a line are shown for each of the horizontal lines forming the weighted tablature 600 and the vertical lines forming the chord diagram 620. Referring to FIG. 7A, in this implementation, the three uppermost horizontal lines 601-603 are formed using a 0.85 point line with a 100% black coloring. The spacing between lines 601 and 602 and 602 and 603 is approximately 4.0 millimeters (centerline to centerline). The three lowermost lines 604, 605 and 606 are formed using 2.00 point, 2.75 point and 3.5 point lines respectively and the spacing between the lines is approximately 4.5 millimeters in each case (centerline to centerline). The line 604 is formed from a 40% black coloring, the line 605 from a 45% black coloring and line 606 from a 50% black coloring. By varying the percentage of black used to form the line, although the line is thicker, markings can still be superimposed over the line and be readable, i.e., a numeric marking indicating a fret at which to play the string represented by the line.

Referring to FIG. 7B, the three rightmost lines 610-612 are formed using 0.85 point and the percentage of black coloring is 100%. The line 613 is formed from 2.00 point and 40% black coloring; line 614 is 2.75 point and 45% black coloring and line 615 is 3.50 point and 50% black coloring. Referring to FIG. 7C, the spacing between lines 610 and 611 and 611 and 612 is approximately 5.0 millimeters (centerline to centerline). The spacing between lines 612 and 613, 613 and 614 and 614 and 615 is approximately 5.5 millimeters in each case (centerline to centerline).

In one particular implementation of a weighted tablature for a four string guitar, the line weight, line spacing and color percentage values are as set forth below in Table 1.

TABLE 1

| String No. | Point | Percentage of Black | Spacing (millimeters) |
|---|---|---|---|
| 1 | 1.00 | 35% | 4 (between 1 and 2) |
| 2 | 2.00 | 40% | 4 (between 2 and 3) |
| 3 | 3.00 | 45% | 4 (between 3 and 4) |
| 4 | 4.00 | 50% | |

In one particular implementation of a weighted tablature for a five string guitar, the line weight, line spacing and color percentage values are as set forth below in Table 2.

TABLE 2

| String No. | Point | Percentage of Black | Spacing (millimeters) |
|---|---|---|---|
| 1 | 1.00 | 30% | 4 (between 1 and 2) |
| 2 | 2.00 | 35% | 4 (between 2 and 3) |
| 3 | 3.00 | 40% | 4 (between 3 and 4) |
| 4 | 4.00 | 45% | 4 (between 4 and 5) |
| 5 | 5.00 | 50% | |

In one particular implementation of a weighted tablature for a seven string guitar, the line weight, line spacing and color percentage values are as set forth below in Table 3.

TABLE 3

| String No. | Point | Percentage of Black | Spacing (millimeters) |
|---|---|---|---|
| 1 | 0.85 | 100% | 4 (between 1 and 2) |
| 2 | 0.85 | 100% | 4 (between 2 and 3) |
| 3 | 0.85 | 100% | 4.5 (between 3 and 4) |
| 4 | 2.00 | 40% | 4.5 (between 4 and 5) |
| 5 | 2.50 | 45% | 4.5 (between 5 and 6) |
| 6 | 3.00 | 50% | 4.5 (between 6 and 7) |
| 7 | 3.50 | 55% | |

As mentioned previously, the implementations described above are exemplary. Other configurations of a weighted tablature or a weighted chord diagram can be provided, depending on the number of strings on the musical instrument, the number of frets desired to be represented and the ordering of strings desired (i.e., thickest on either the uppermost or lowermost line of the tablature staff, or as the leftmost or rightmost line of the chord diagram). Additionally, the weighted tablature can be used with either numeric markings or with alphabetical markings, in the case of Baroque style tablature.

In an alternative implementation, the lines used to form the weighted tablature or weighted chord diagram can be of a color different than black, although the line thickness variations and optionally the shading of the color does vary as was shown herein in the implementation using black coloring. In yet another implementation, multiple colors can be used to represent the lines forming the weighted tablature or weighted chord diagram. Again, however, the line thickness variations and optionally the shading of the color varies as was shown herein in the implementation using a single color, i.e., black.

As mentioned above, the weighted tablature and the weighted chord diagram can be presented on a physical media, for example, printed on paper. By including markings on the weighted tablature or weighted chord diagrams presented on a physical media, sheet music can provided. Alternatively, the weighted tablature and the weighted chord diagram can be presented electronically, for example, by display on an electronic device such as a computer screen.

A number of embodiments of the invention have been described. Nevertheless, it will be understood that various modifications may be made without departing from the spirit and scope of the invention. Accordingly, other embodiments are within the scope of the following claims.

What is claimed is:

1. A method of preparing tablature for use with a stringed instrument comprising:

determining a number of strings included in the stringed instrument;

calculating a line weight for each of the same number of lines as number of strings, where each line corresponds to a string and the line weight is calculated based on the thickness of the corresponding string; and printing on a tangible medium a visually observable tablature comprising the number of horizontal lines weighted according to the calculated line weights, where each line represents a string of the stringed instrument and at least some of the lines are of varying line weights based on the calculated line weights and where a relative thickness of a line corresponds to a relative thickness of the string represented by the line.

2. The method of claim 1, where a lowermost line is a thickest line and where the thicknesses of the lines decreases in a direction from the lowermost to an uppermost line.

3. The method of claim 2, where the stringed instrument is a six-string guitar and where the tablature includes six horizontal lines and the lowermost line corresponds to a sixth string on the guitar, the uppermost line corresponds to a first string on the guitar and the lines between the uppermost and lowermost lines correspond to the second through fifth strings on the guitar in a sequential order.

4. The method of claim 1, where an uppermost line is a thickest line and where the thicknesses of the lines decreases in a direction from the uppermost to a lowermost line.

5. The method of claim 4, where the stringed instrument is a six-string guitar and where the tablature includes six horizontal lines and the uppermost line corresponds to a sixth string on the guitar, the lowermost line corresponds to a first string on the guitar and the lines between the uppermost and lowermost lines correspond to the second through fifth strings on the guitar in a sequential order.

6. The method of claim 1, where the stringed instrument is a six-string guitar and there are six horizontal lines and:
a first line corresponds to a first string on the guitar;
a second line corresponds to a second string on the guitar;
a third line corresponds to a third string on the guitar;
a fourth line corresponds to a fourth string on the guitar;
a fifth line corresponds to a fifth string on the guitar;
a sixth line corresponds to a sixth string on the guitar; and
where the first, second and third lines are of approximately the same thickness, the fourth line is thicker than the first, second and third lines, the fifth line is thicker than the fourth line and the sixth line is thicker than the fifth line.

7. The method of claim 6, where:
a first line spacing calculated between the first line and the second line is approximately equal to a first line spacing between the second line and the third line;
a second line spacing calculated between the third line and the fourth line is approximately equal to a second spacing between the fourth line and the fifth line and is also approximately equal to a second spacing between the fifth line and the sixth line; and
the first line spacing is less than the second line spacing.

8. The method of claim 6, where:
the first line corresponds to the note high E;
the second line corresponds to the note B;
the third line corresponds to the note G;
the fourth line corresponds to the note D;
the fifth line corresponds to the note A; and
the sixth line corresponds to the note low E.

9. The method of claim 6, where the first line is an uppermost line and the sixth line is a lowermost line and the second, third, fourth and fifth lines are positioned between the first and the sixth line in sequential order.

10. The method of claim 1, where the stringed instrument is an instrument from a group consisting of: a guitar, a bass, a lute and a vihuela.

11. The method of claim 1, farther comprising:
printing on the visually observable tablature staff one or more markings, where each marking is positioned on one of the horizontal lines and the position of a marking and a value of the marking indicate a string to be played and a fret at which to play the string respectively.

12. The method of claim 11, where each marking is a numeric marking.

13. The method of claim 11, where each marking is an alphabetical marking.

14. The method of claim 1, further comprising:
calculating a line spacing between each pair of neighboring lines, where the line spacing is calculated based on the line weights of each line in the pair of neighboring lines;
wherein printing the visually observable tablature comprises spacing the lines according to the calculated line spacing.

15. The method of claim 1, further comprising:
calculating a percentage of black to use when printing each line, where calculating the percentage of black for a line is based on a thickness of the line;
wherein printing the visually observable tablature comprises printing each line according to the calculated percentage of black.

16. A method of preparing a chord diagram for use with a stringed instrument comprising:
determining a number of strings included in the stringed instrument;
calculating a line weight for each of the same number of vertical lines as number of strings, where each vertical line corresponds to a string and the line weight is calculated based on the thickness of the corresponding string; and
printing on a tangible medium a visually observable chord diagram comprising:
the number of vertical lines weighted according to the calculated line weights, where each vertical line represents a string of the stringed instrument and at least some of the vertical lines are of varying line weights based on the calculated line weight, the relative thickness of a vertical line corresponding to a relative thickness of the string represented by the vertical line; and
a plurality of horizontal lines, where at least some of the horizontal lines represent a fret;
where the vertical lines are intersected by the horizontal lines forming a grid, and a marking placed on a vertical line and within a space between two horizontal lines indicates a string to be played at a specified fret.

17. The method of claim 16, where a marking placed above a vertical line indicates an open string to be played.

18. The method of claim 16, where a leftmost vertical line is a thickest line and where the thicknesses of the vertical lines decrease in a direction from the leftmost to a rightmost line.

19. The method of claim 18, where the stringed instrument is a six-string guitar and where there are six vertical lines and the leftmost vertical line corresponds to a sixth string on the guitar, the rightmost vertical line corresponds to a first string on the guitar, and the lines between the leftmost and rightmost lines correspond to the fifth through second strings on the guitar in a sequential order.

20. The method of claim 16, where a rightmost vertical line is a thickest line and where the thicknesses of the vertical lines decrease in a direction from the rightmost to a leftmost vertical line.

21. The method of claim 20, where the stringed instrument is a six-string guitar and where there are six vertical lines and the rightmost vertical line corresponds to a sixth string on the guitar, the leftmost vertical line corresponds to a first string on the guitar the lines between the leftmost and rightmost lines correspond to the second through fifth strings on the guitar in a sequential order.

22. The method of claim 20, where the stringed instrument is a six-string guitar and where there are six vertical lines and the rightmost vertical line corresponds to a sixth string on the guitar, the leftmost vertical line corresponds to a first string on the guitar the lines between the leftmost and rightmost lines correspond to the second through fifth strings on the guitar in a sequential order.

23. The method of claim 16, where the stringed instrument is a six-string guitar and there are six vertical lines and:
   a first vertical line corresponds to a first string on the guitar;
   a second vertical line corresponds to a second string on the guitar;
   a third vertical line corresponds to a third string on the guitar;
   a fourth vertical line corresponds to a fourth string on the guitar;
   a fifth vertical line corresponds to a fifth string on the guitar;
   a sixth vertical line corresponds to a sixth string on the guitar; and
   where the first, second and third vertical lines are of approximately the same thickness, the fourth vertical line is thicker than the first, second and third vertical lines, the fifth vertical line is thicker than the fourth vertical line and the sixth vertical line is thicker than the fifth vertical line.

24. The method of claim 23, where:
   the first line corresponds to the note high E;
   the second line corresponds to the note B;
   the third line corresponds to the note G;
   the fourth line corresponds to the note D;
   the fifth line corresponds to the note A; and
   the sixth line corresponds to the note low E.

25. The method of claim 23, where the first vertical line is a rightmost line and the sixth vertical line is a leftmost line and the second, third, fourth and fifth lines are spaced between the first and the sixth lines in sequential order.

26. The method of claim 16, where the stringed instrument is an instrument from a group consisting of: a guitar, a bass, a lute and a vihuela.

27. The method of claim 16, where a rightmost vertical line is a thickest line and where the thicknesses of the vertical lines decrease in a direction from the rightmost to a leftmost vertical line.

28. The method of claim 16, further comprising:
   calculating a line spacing between each pair of neighboring vertical lines, where the line spacing is calculated based on the line weights of each line in the pair of neighboring lines;
   wherein printing the visually observable chord diagram comprises spacing the vertical lines according to the calculated line spacing.

29. The method of claim 28, where:
   a first line spacing calculated between the first vertical line and the second vertical line is approximately equal to a first line spacing between the second vertical line and the third vertical line and is also approximately equal to a first line spacing between the third vertical line and the second vertical line;
   a second line spacing calculated between the third vertical line and the fourth vertical line is approximately equal to a second line spacing between the fourth vertical line and the fifth vertical line and is also approximately equal to a second line spacing between the fifth vertical line and the sixth vertical line; and
   the first line spacing is less than the second line spacing.

30. The method of claim 16, further comprising:
   calculating a percentage of black to use when printing each vertical line, where calculating the percentage of black for a line is based on a thickness of the line;
   wherein printing the visually observable chord diagram comprises printing each vertical line according to the calculated percentage of black for the vertical line.

31. The method of claim 16, further comprising:
   calculating a line spacing between each pair of neighboring vertical lines, where the line spacing is calculated based on the line weights of each line in the pair of neighboring lines;
   wherein providing the chord diagram comprises spacing the vertical lines according to the calculated line spacing.

32. A method for notating strings to be played on a stringed instrument, comprising:
   determining a number of strings included in the stringed instrument;
   calculating a line weight for each of the same number of lines as number of strings, where each line corresponds to a string and the line weight is calculated based on the thickness of the corresponding string; and
   providing a weighted tablature comprising the number of horizontal lines weighted according to the calculated line weight, where each line represents a string on the stringed instrument and at least some of the lines are of varying line weights according to the calculated line weights, the relative thickness of a line corresponding to a relative thickness of the string represented by the line; and
   indicating on the weighted tablature staff one or more markings, where each marking is positioned on one of the horizontal lines;
   wherein the position of a marking and a value of the marking indicate a string to be played and a fret at which to play the string respectively.

33. The method of claim 32, where the stringed instrument is a guitar.

34. The method of claim 32, where the marking is a numeric marking.

35. The method of claim 32, where the marking is an alphabetical marking.

36. The method of claim 32, further comprising:
   calculating a line spacing between each pair of neighboring lines, where the line spacing is calculated based on the line weights of each line in the pair of neighboring lines;
   wherein providing the tablature comprises spacing the lines according to the calculated line spacing.

37. A method for notating strings to be played on a stringed instrument, comprising:
   determining a number of strings included in the stringed instrument;
   calculating a line weight for each of the same number of vertical lines as number of strings, where each vertical line corresponds to a string and the line weight is calculated based on the thickness of the corresponding string; and
   providing a weighted chord diagram comprising:
      the number of vertical lines weighted according to the calculated line weights, where each vertical line represents a string on the stringed instrument and at least some of the vertical lines are of varying line weights according to the calculated line weights, the relative thickness of a vertical line corresponding to a relative thickness of the string represented by the vertical line; and
      a plurality of horizontal lines, where at least some of the horizontal lines represent a fret;
      where the vertical lines are intersected by the horizontal lines forming a grid; and indicating on the weighted chord diagram one or more markings, where each marking is positioned on one of the vertical lines and within a space between two horizontal lines;

wherein the position of a marking indicates a string to be played based on the vertical line upon which the marking is positioned and a fret at which to play the string based on the space within which the marking is positioned.

38. The method of claim 37, where the stringed instrument is a guitar.

39. The method of claim 37, further comprising:
providing the weighted chord diagram displayed on an electronic device.

40. The method of claim 31, where the electronic device is a computer and the weighted chord diagram is displayed on a computer monitor coupled to the computer.

41. A method for producing sound from a stringed musical instrument, comprising:
providing a visually observable tablature comprising a plurality of horizontal lines, where each line represents a string on the musical instrument and at least some of the lines are of varying thicknesses, the relative thickness of a line corresponding to a relative thickness of the string represented by the line;
visually depicting on the tablature a plurality of markings, where each marking is positioned on one of the horizontal lines and where the position of a marking and a value of the marking indicate a string to be played and a fret at which to play the string respectively;
producing sound responsive to the markings visually depicted on the tablature.

42. The method of claim 41, where a lowermost line is a thickest line and where the thicknesses of the lines decreases in a direction from the lowermost to an uppermost line.

43. The method of claim 42, where the stringed instrument is a six-string guitar and where the tablature includes six horizontal lines and the lowermost line corresponds to a sixth string on the guitar, the uppermost line corresponds to a first string on the guitar and the lines between the uppermost and lowermost lines correspond to the second through fifth strings on the guitar in a sequential order.

44. The method of claim 41, where an uppermost line is a thickest line and where the thicknesses of the lines decreases in a direction from the uppermost to a lowermost line.

45. The method of claim 44, where the stringed instrument is a six-string guitar and where the tablature includes six horizontal lines and the uppermost line corresponds to a sixth string on the guitar, the lowermost line corresponds to a first string on the guitar and the lines between the uppermost and lowermost lines correspond to the second through fifth strings on the guitar in a sequential order.

46. A method for producing sound from a stringed musical instrument, comprising:
providing a visually observable chord diagram comprising:
a plurality of vertical lines, where each line represents a string on the musical instrument and at least some of the lines are of varying thicknesses, the relative thickness of a line corresponding to a relative thickness of the string represented by the line; and
a plurality of horizontal lines, where at least some of the lines represent a fret;
where the vertical lines are intersected by the horizontal lines forming a grid;
visually depicting on the chord diagram one or more markings, where each marking is positioned on one of the vertical lines and within a space between two horizontal lines and where the position of a marking indicates a string to be played based on the vertical line upon which the marking is positioned and a fret at which to play the string based on the space within which the marking is positioned; and
producing sound responsive to the markings visually depicted on the chord diagram.

47. The method of claim 46, where a leftmost vertical line is a thickest line and where the thicknesses of the vertical lines decrease in a direction from the leftmost to a rightmost line.

48. The method of claim 47, where the stringed instrument is a six-string guitar and where there are six vertical lines and the leftmost vertical line corresponds to a sixth string on the guitar, the rightmost vertical line corresponds to a first string on the guitar, and the lines between the leftmost and rightmost lines correspond to the fifth through second strings on the guitar in a sequential order.

49. A method for operating a guitar to produce sound from the guitar, comprising:
providing a guitar having a set of strings, the guitar being operative for producing sound of different pitches by playing different of said strings;
providing a visually observable tablature comprising a plurality of horizontal lines, where each line represents a string on the guitar and at least some of the lines are of varying thicknesses, the relative thickness of a line corresponding to a relative thickness of the string represented by the line;
visually depicting on the tablature a plurality of markings, where each marking is positioned on one of the horizontal lines and where the position of a marking and a value of the marking indicate a string to be played and a fret at which to play the string respectively to produce a sound of a corresponding pitch; and
playing strings on the guitar, where the strings played and the frets at which the strings are played correspond to pitches represented by the markings visually depicted on the tablature, where sound is produced by playing the strings.

50. The method of claim 49, where a lowermost line is a thickest line and where the thicknesses of the lines decreases in a direction from the lowermost to an uppermost line.

51. The method of claim 50, where the stringed instrument is a six-string guitar and where the tablature includes six horizontal lines and the lowermost line corresponds to a sixth string on the guitar, the uppermost line corresponds to a first string on the guitar and the lines between the uppermost and lowermost lines correspond to the second through fifth strings on the guitar in a sequential order.

52. The method of claim 49, where an uppermost line is a thickest line and where the thicknesses of the lines decreases in a direction from the uppermost to a lowermost line.

53. The method of claim 52, where the stringed instrument is a six-string guitar and where the tablature includes six horizontal lines and the uppermost line corresponds to a sixth string on the guitar, the lowermost line corresponds to a first string on the guitar and the lines between the uppermost and lowermost lines correspond to the second through fifth strings on the guitar in a sequential order.

* * * * *

UNITED STATES PATENT AND TRADEMARK OFFICE
CERTIFICATE OF CORRECTION

PATENT NO. : 7,482,525 B2
APPLICATION NO. : 11/450660
DATED : January 27, 2009
INVENTOR(S) : Nathalie Reverdin It is certified that error appears in the above-identified patent and that said Letters Patent is hereby corrected as shown below:

Column 11, Line 58 at Claim 11; replace:
"The method of claim 1, farther comprising:" with
-- The method of claim 1, further comprising: --

Column 12, Line 30 at Claim 16; replace:
"based on the calculated line weight, the relative thick-" with
-- based on the calculated line weights, the relative thick- --

Column 12, Line 60 at Claim 21; replace:
"the guitar the lines between the leftmost and rightmost lines" with
-- the guitar and the lines between the leftmost and rightmost lines --

Column 13, Line 1 at Claim 22; replace:
"the guitar the lines between the leftmost and rightmost lines" with
-- the guitar and the lines between the leftmost and rightmost lines --

Column 14, Line 12 at Claim 32; replace:
"indicating on the weighted tablature staff one or more" with
-- indicating on the weighted tablature one or more --

Column 15, Line 14 at Claim 40; replace:
"The method of claim 31, where the electronic device is"
-- The method of claim 39, where the electronic device is --

Signed and Sealed this

Seventeenth Day of March, 2009

JOHN DOLL
*Acting Director of the United States Patent and Trademark Office*